United States Patent
Cook et al.

(10) Patent No.: US 11,362,844 B1
(45) Date of Patent: Jun. 14, 2022

(54) SECURITY DEVICE AND METHODS FOR END-TO-END VERIFIABLE ELECTIONS

(71) Applicant: Vidaloop, Inc., La Mesa, CA (US)

(72) Inventors: Ryan Scott Cook, La Mesa, CA (US); David Wallick, Denver, CO (US)

(73) Assignee: Vidaloop, Inc., La Mesa, CA (US)

( * ) Notice: Subject to any disclaimer, the term of this patent is extended or adjusted under 35 U.S.C. 154(b) by 0 days.

(21) Appl. No.: 17/461,954

(22) Filed: Aug. 30, 2021

Related U.S. Application Data

(60) Provisional application No. 63/226,697, filed on Jul. 28, 2021.

(51) Int. Cl.
  *H04L 9/32* (2006.01)
  *H04L 9/08* (2006.01)

(52) U.S. Cl.
  CPC .......... *H04L 9/3268* (2013.01); *H04L 9/0894* (2013.01)

(58) Field of Classification Search
  None
  See application file for complete search history.

(56) References Cited

U.S. PATENT DOCUMENTS

| | | | |
|---|---|---|---|
| 9,727,883 B2 | 8/2017 | Richardson | |
| 2005/0167484 A1 | 8/2005 | Sussman | |
| 2010/0268942 A1* | 10/2010 | Hernandez-Ardieta | H04L 9/006 713/156 |
| 2012/0233253 A1 | 9/2012 | Ricci | |
| 2018/0004953 A1* | 1/2018 | Smith, II | G06F 21/78 |
| 2018/0034646 A1* | 2/2018 | Kuramoto | H04L 9/3268 |
| 2020/0258338 A1 | 8/2020 | Goswami | |
| 2020/0382294 A1 | 12/2020 | Pilozzi | |
| 2021/0319642 A1 | 10/2021 | Boyd et al. | |

\* cited by examiner

*Primary Examiner* — Brandon Hoffman
(74) *Attorney, Agent, or Firm* — Carr & Ferrell LLP

(57) ABSTRACT

Systems and methods for provisioning and operating a primary security device in a verifiable end-to-end election system are presented herein. The security device serves as a root of trust for chains of certificates that are deployed and utilized throughout the election process. These chains of certificates, originating with the device, which acts as an intermediate certification authority, are used to create a verifiable trust chain throughout the different parts of the election process, the trust chain being traceable back to the device and to the original root of trust certificate. In various embodiments the security device includes a compute module, a security chip, a connection to a human interface display device, at least one lockable transfer device port, and an air-gapped main board to house the compute module, the security chip, and the lockable transfer device port.

30 Claims, 14 Drawing Sheets

```
┌─────────────────────────────────────────────────────────────────────┐
│ Generating at least one private key and at least one certificate signing request │
│                  by an election management system                   │
│                                 705                                  │
└─────────────────────────────────────────────────────────────────────┘
┌─────────────────────────────────────────────────────────────────────┐
│ Transferring an election management system package with the at least one │
│  certificate signing request to the security device via a transfer device │
│                                 710                                  │
└─────────────────────────────────────────────────────────────────────┘
┌─────────────────────────────────────────────────────────────────────┐
│      Signing at least one certificate signing request by the security device │
│                                 715                                  │
└─────────────────────────────────────────────────────────────────────┘
┌─────────────────────────────────────────────────────────────────────┐
│ Transferring the signed certificate to the election management system via the │
│                            transfer device                           │
│                                 720                                  │
└─────────────────────────────────────────────────────────────────────┘
```

FIG. 7

Generating a single string by normalizing input data fields and concatenating them together
905

Performing unicode normalization on the single string
910

Generating, a random token or authentication code
915

Running both the normalized input data and the random token/authentication code through a password based key derivation function, creating a private key
920

Testing the created private key for validity
925

If private key valid: Generating a public key derived from the private key
930

Delete the private key
935

FIG. 9

SECURITY DEVICE AND METHODS FOR END-TO-END VERIFIABLE ELECTIONS

CROSS REFERENCE TO RELATED APPLICATIONS

This application claims the benefit of U.S. Provisional Application No. 63/226,697, titled "END-TO-END VERIFIABLE PROOF OF VOTES CAST IN ELECTIONS" filed on Jul. 28, 2021.

FIELD OF INVENTION

The present technology pertains to systems and methods for provisioning, setting up and running elections on public or private networks. In particular, but not by way of limitation, the present technology provides a security device and methods for end-to-end verifiable elections.

SUMMARY

Presented herein are systems and methods for provisioning and operating an air gapped security device for an end-to-end verifiable election, the method comprising issuing a copy of a signed root certificate to an air gapped security device, wherein the copy of the signed root certificate is stored in the security device; generating a certificate signing request; signing the certificate signing request by a root private key, producing an intermediate certificate associated to the security device, wherein the intermediate certificate is stored in the security device; generating, by the security device, a security device private key associated with the security device, wherein the security device private key is stored in the security device; and cryptographically locking the security device, preventing access to the stored intermediate certificate, the security device private key and the copy of the signed root certificate.

In various embodiments, the systems and methods further comprise accessing the security device with at least two individuals physically present at a limited functionality human interface display device coupled to the security device, wherein the at least two individuals must verify their presence via the human interface display device, the human interface display device being connected serially to the security device.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
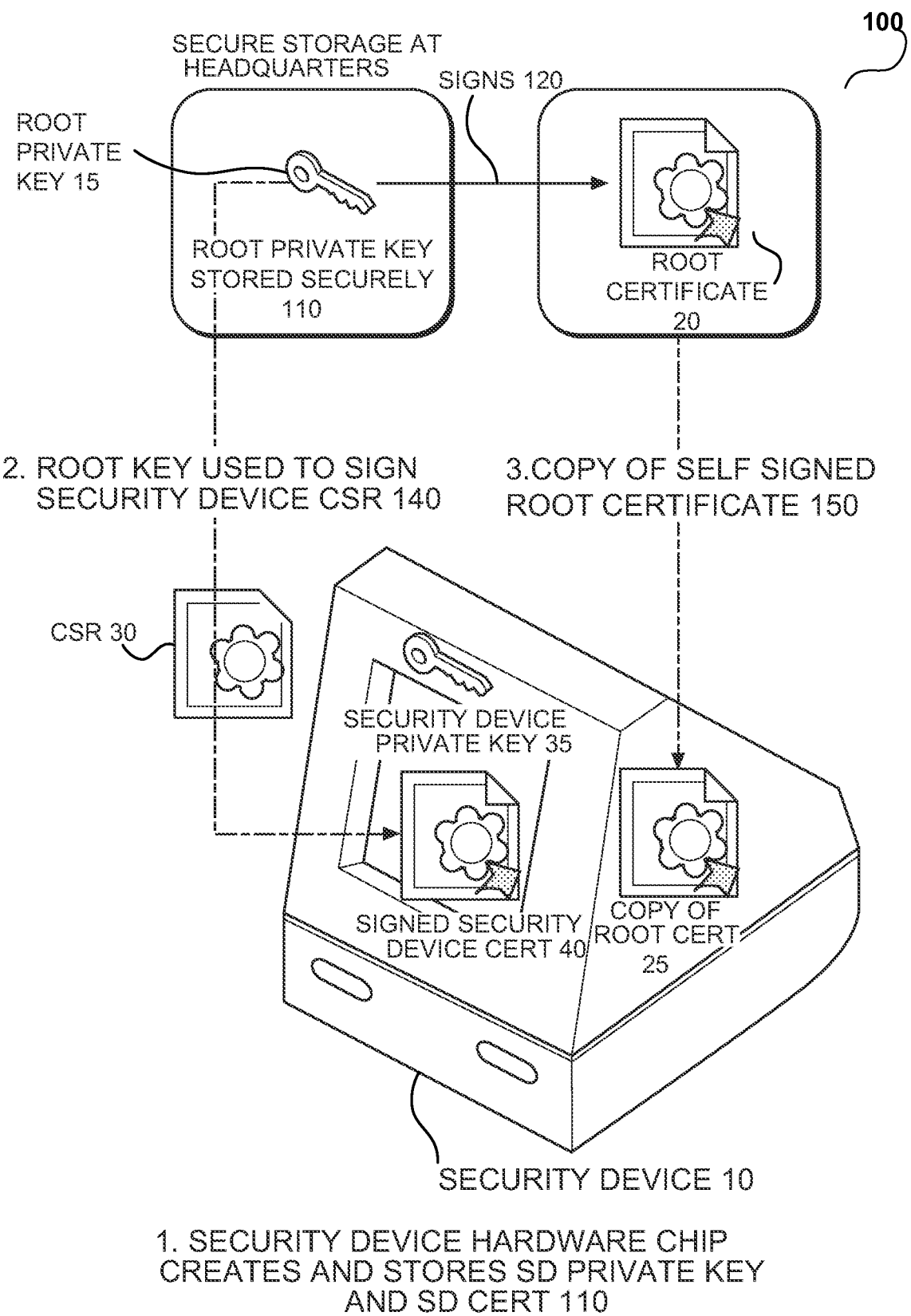

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 presents one exemplary embodiment of a method to initially set up an air gapped security device.

Figure 2:
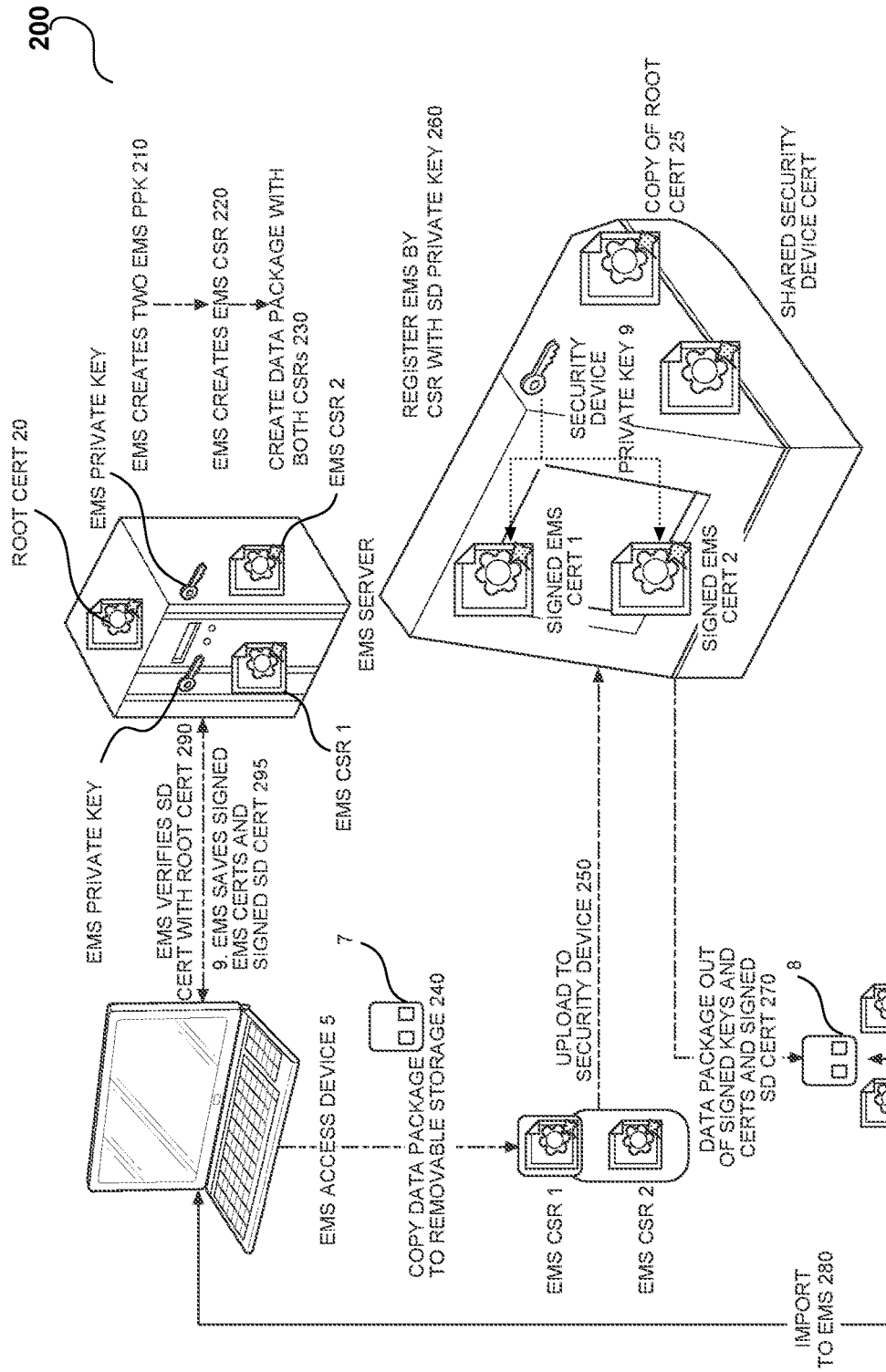

FIG. 2 is a diagrammatical representation of one exemplary embodiment of a method to link the security device to an election management system (referred to herein as "EMS").

Figure 3:
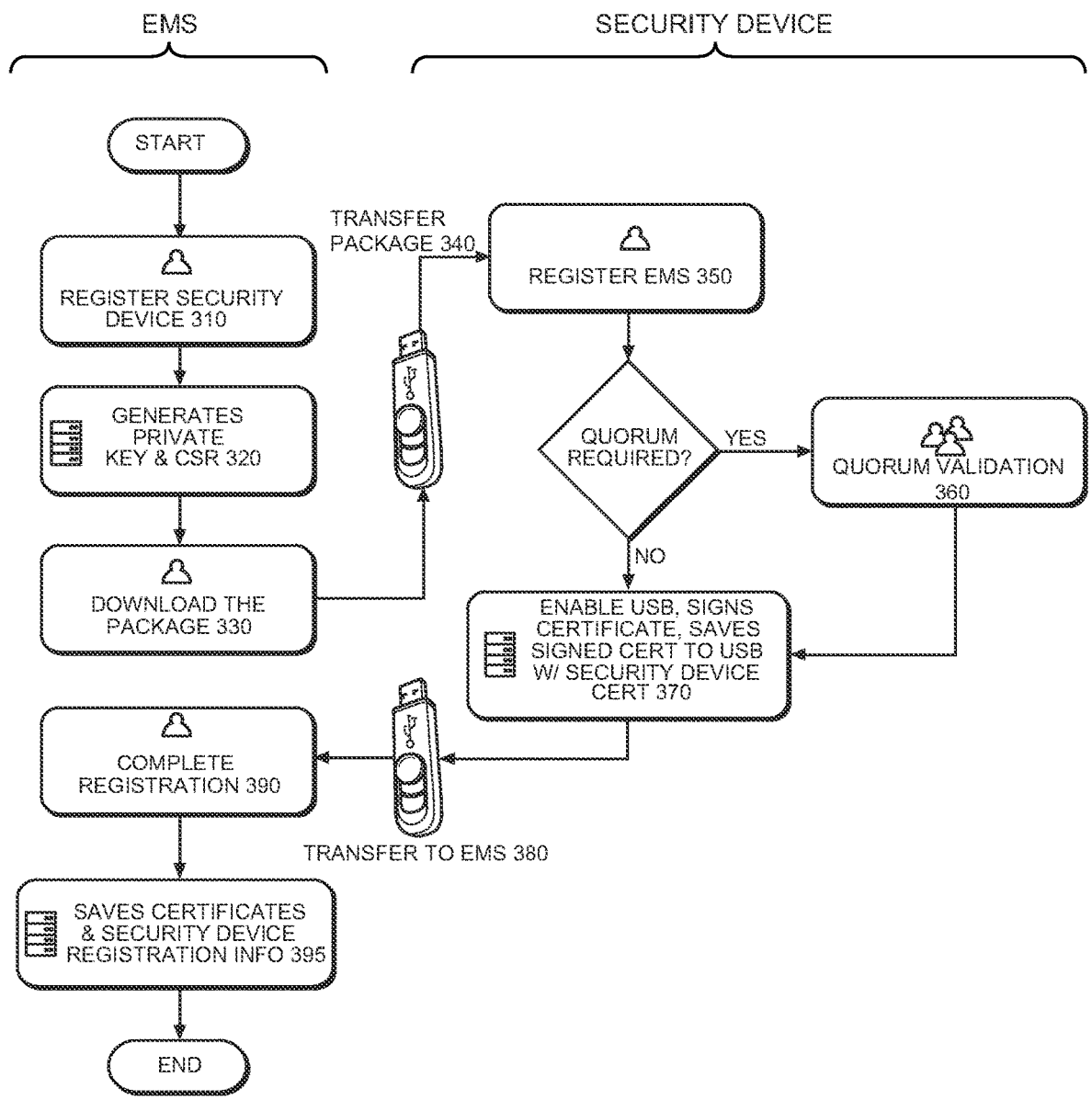

FIG. 3 is a diagrammatical representation of another exemplary embodiment of a method to link the security device to an EMS.

Figure 4:
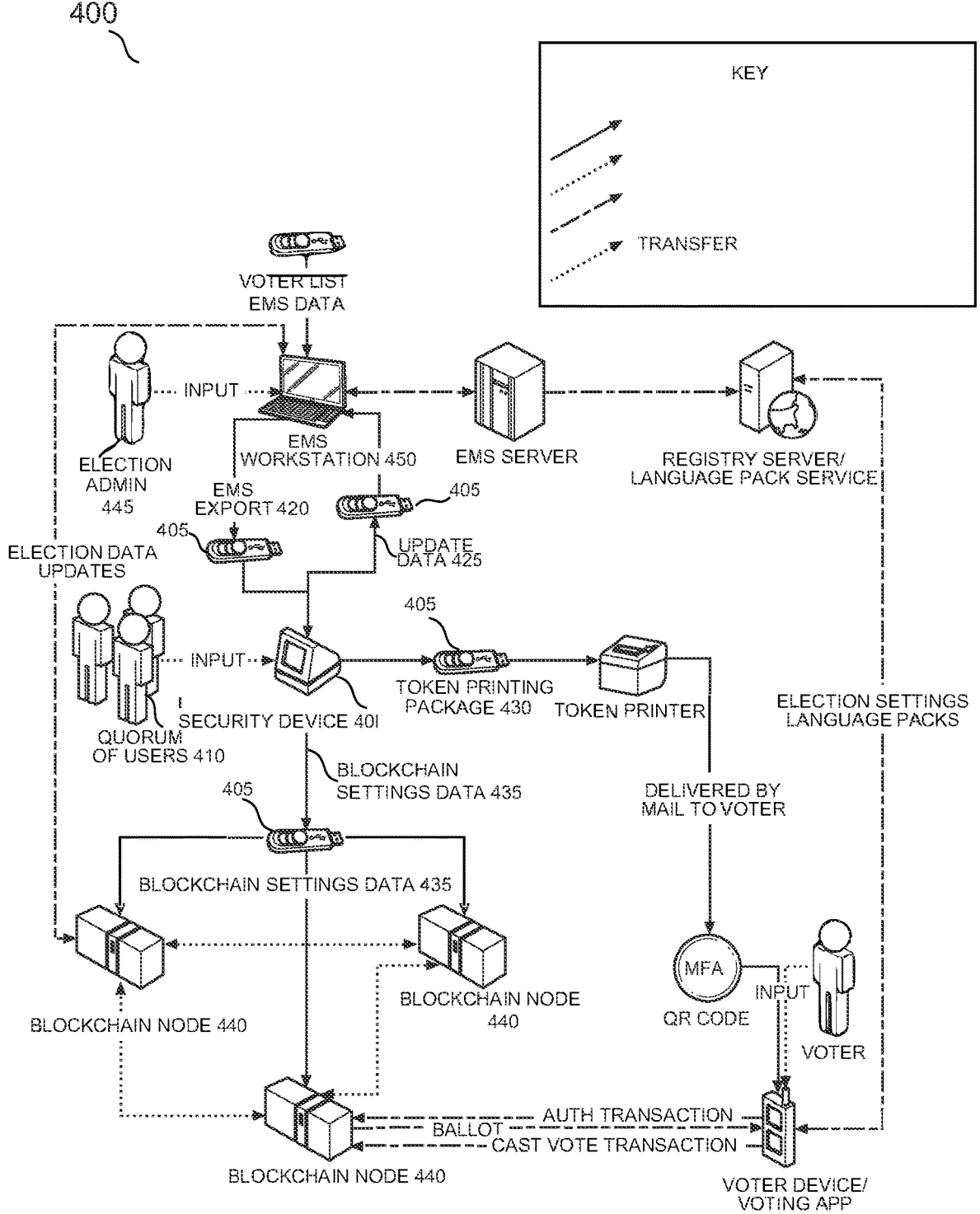

FIG. 4 is a diagrammatical representation of one embodiment of the security device being utilized in an election system process.

Figure 5:
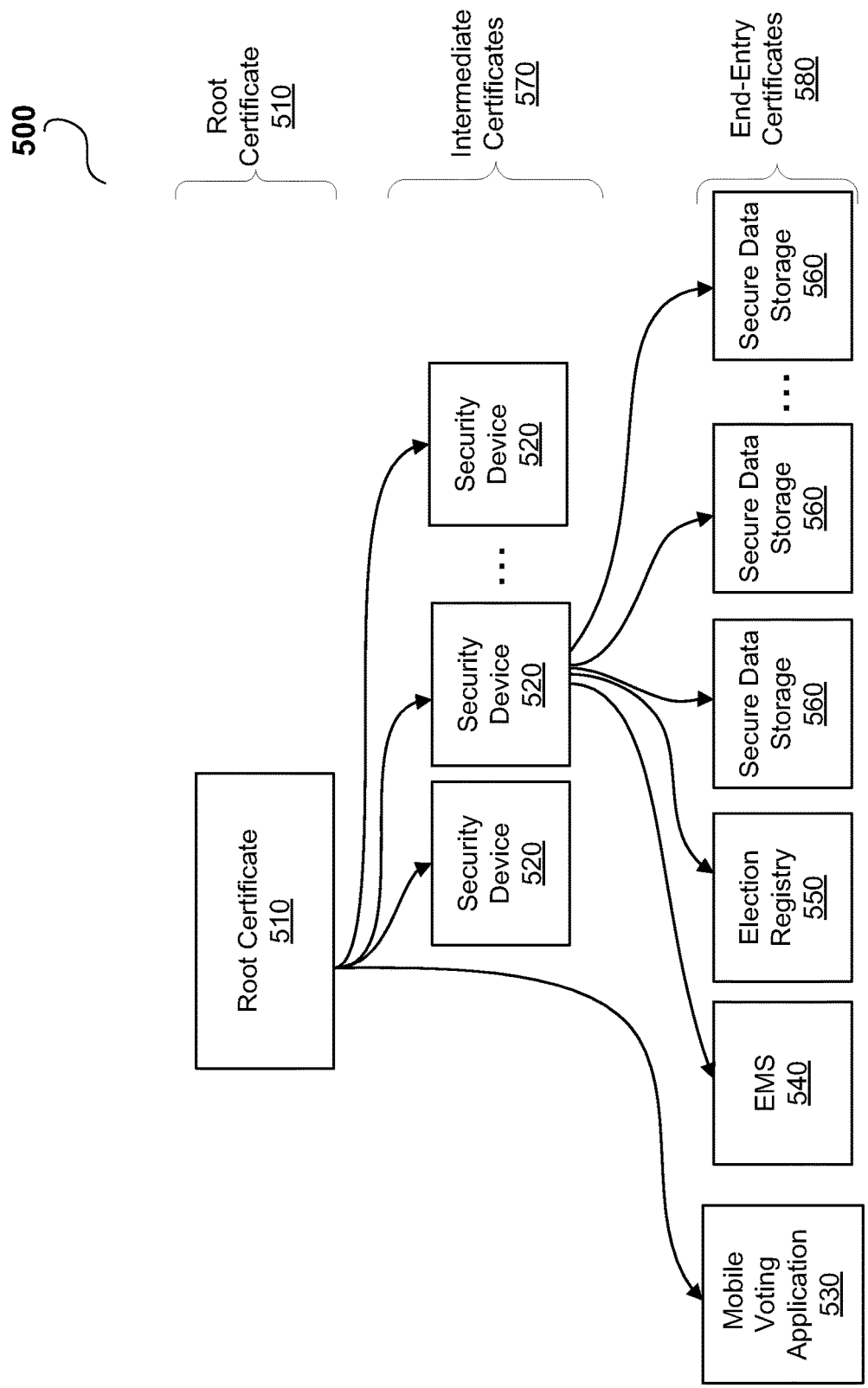

FIG. 5 presents a diagram of a simplified embodiment of how the chain of trust in the system is established and traceable through distribution of certificates throughout the system.

Figure 6:
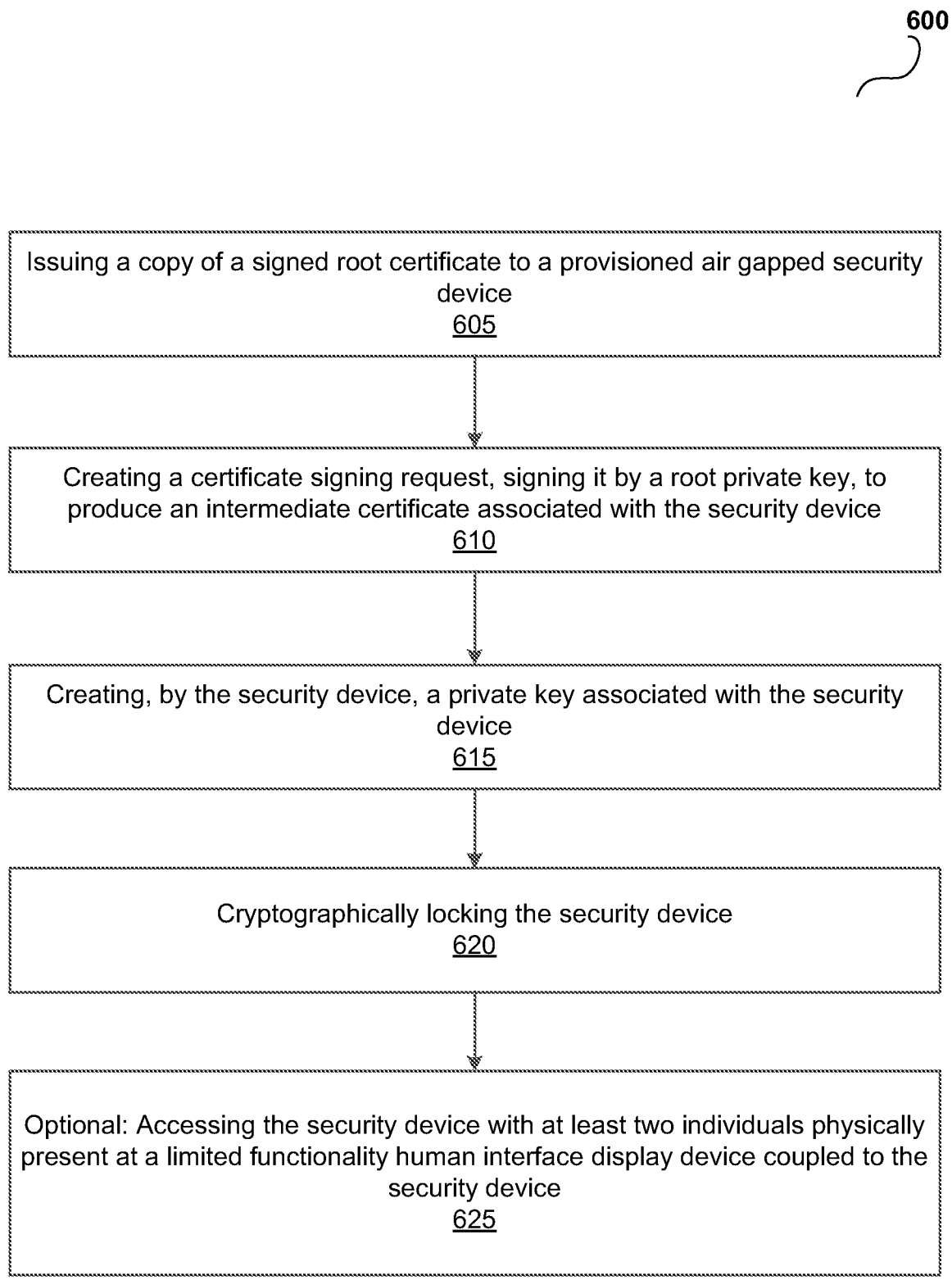

FIG. 6 presents one embodiment of an exemplary method to provision and run an air gapped security device.

FIG. 7 presents one embodiment of an exemplary method to link a security device to an EMS.

Figure 8:
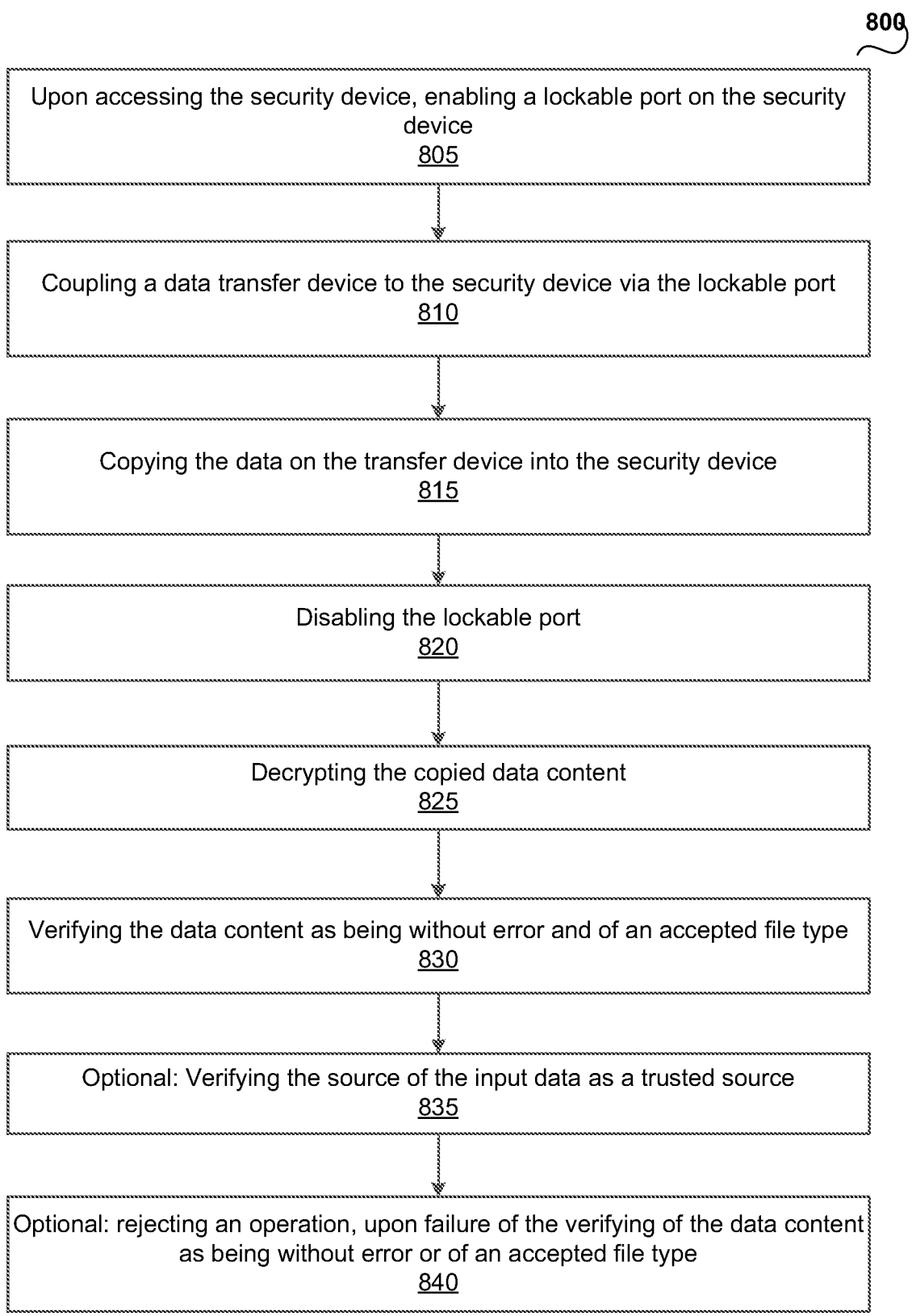

FIG. 8 presents an embodiment of an exemplary method to input data into the security device.

FIG. 9 presents one embodiment of an exemplary method to generate, by the security device, an authenticated voter export package.

Figure 10:
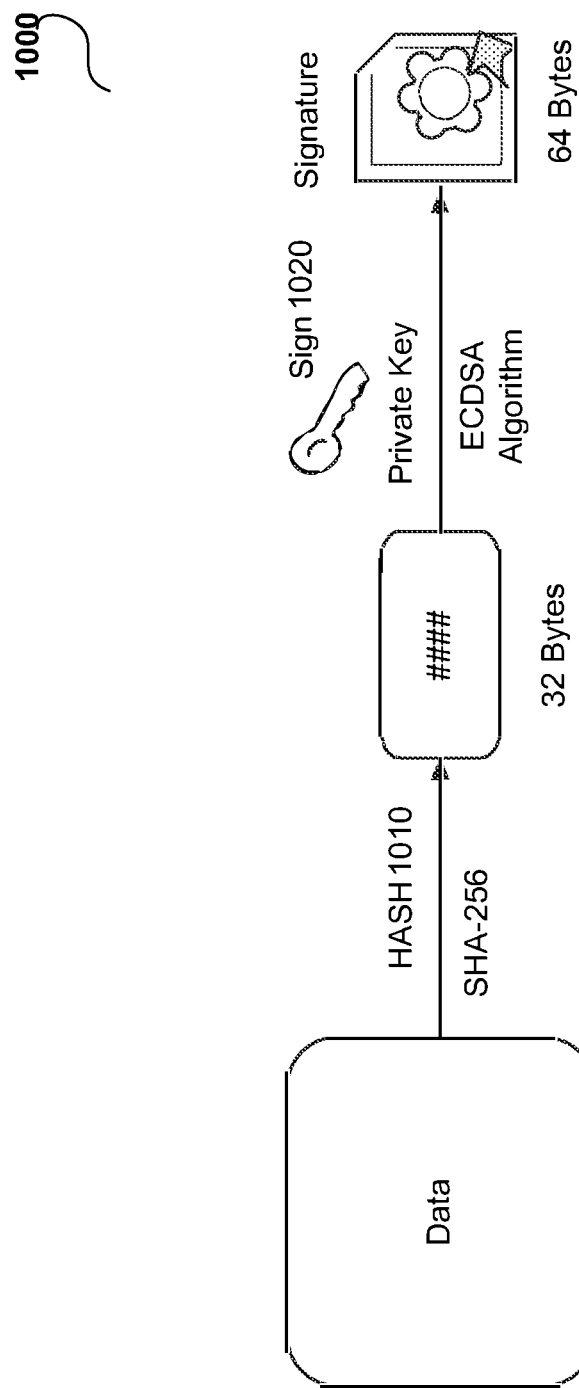

FIG. 10. is a diagrammatical representation of an exemplary embodiment of how the security device may encrypt and sign data.

Figure 11:
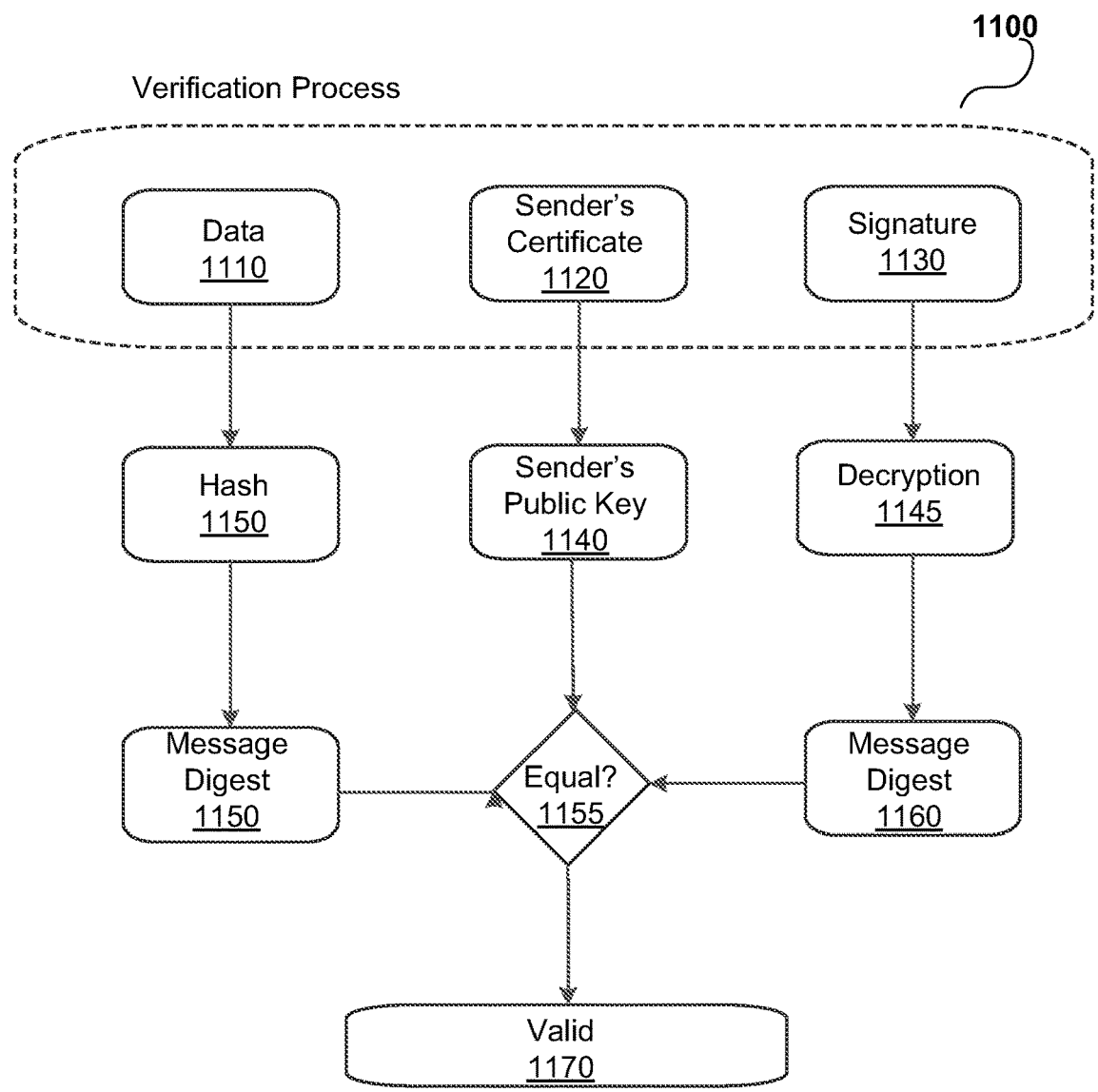

FIG. 11 is a diagrammatical representation of an exemplary embodiment of data is verified by the security device.

Figure 12:
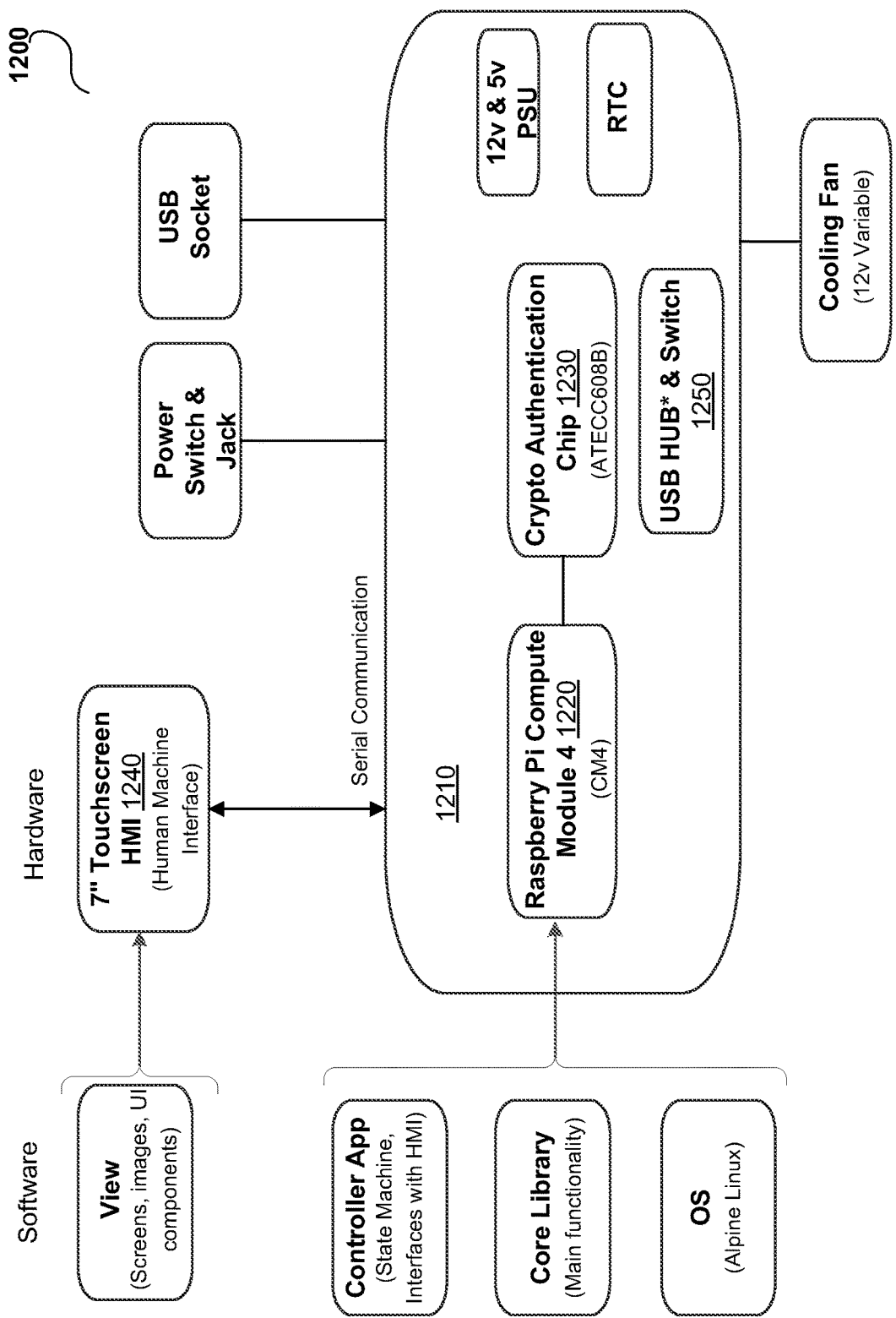

FIG. 12 presents one embodiment of the security device.

Figure 13:
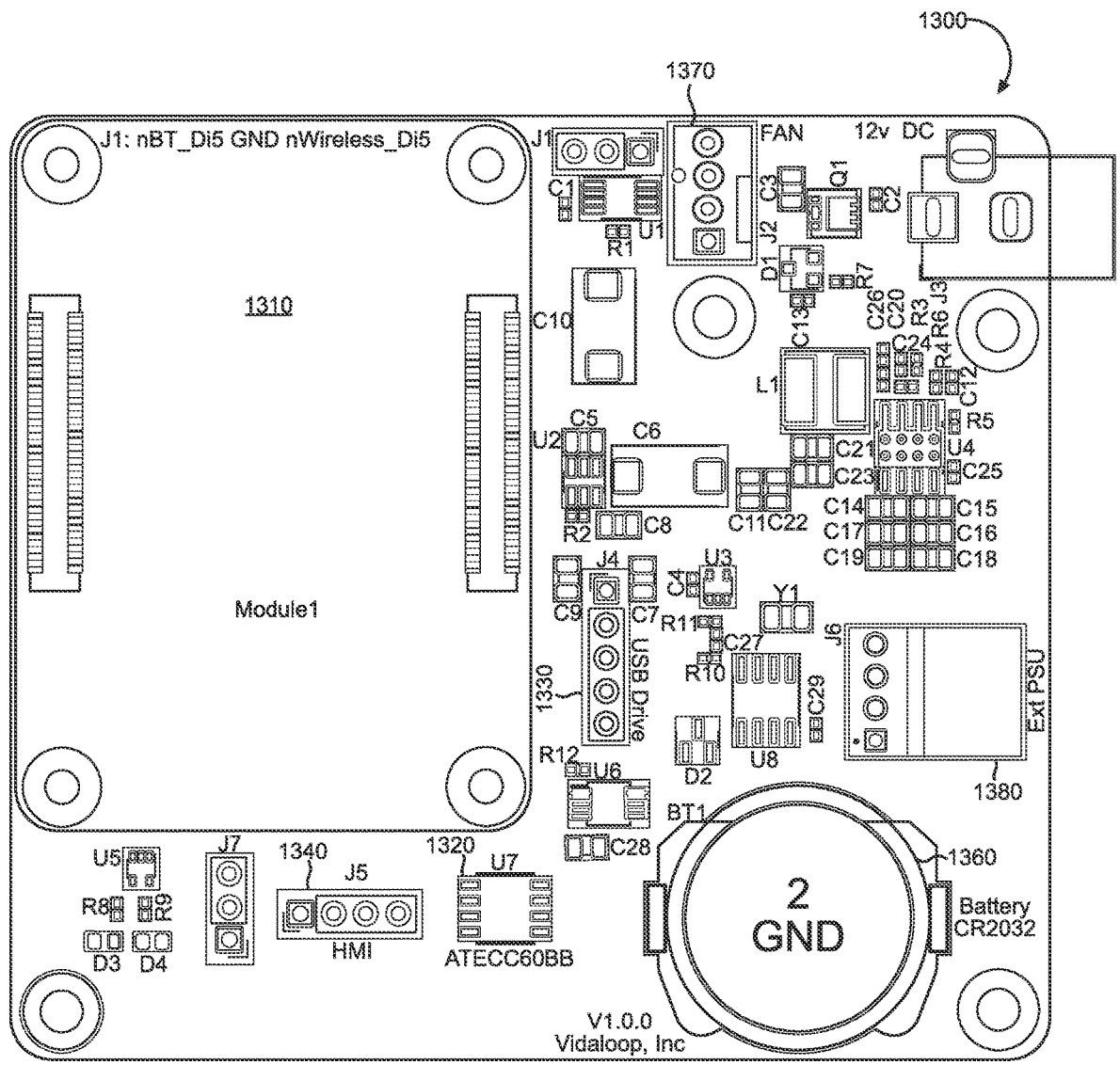

FIG. 13 presents one embodiment of a custom security device mainboard.

Figure 14:
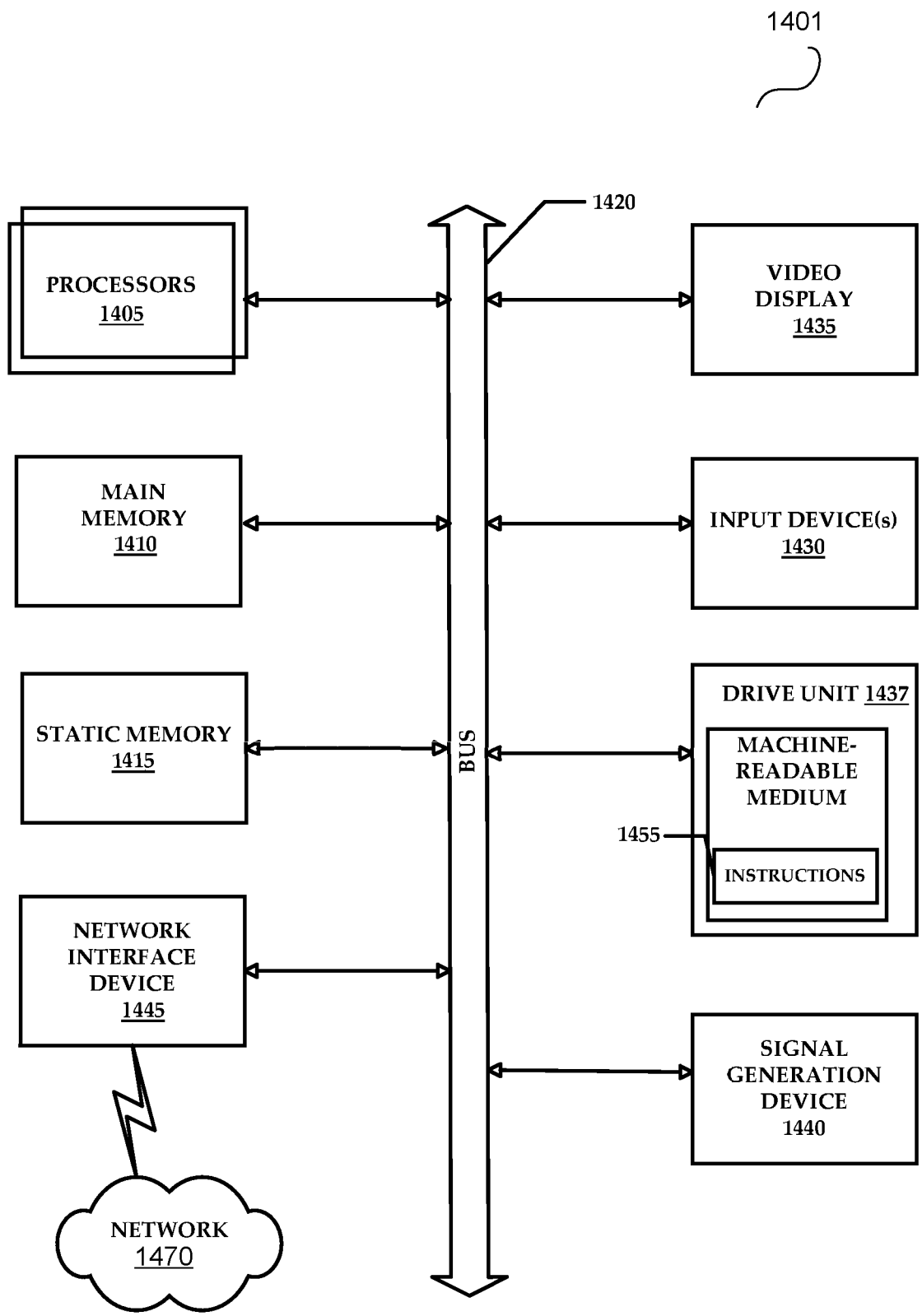

FIG. 14 is a diagrammatic representation of an example machine that may execute one or more of the methods for various parts of the processes described herein.

DETAILED DESCRIPTION

Currently, elections are primarily run on a paper ballot system, whereby, a voter must be physically present at a polling station and submit a paper ballot, or alternatively mail in a certified paper ballot. In some elections voters can use a voting machine to cast their vote and then receive a paper receipt or confirmation of their vote afterwards. Various elections utilize a mixture of paper ballots, mail-in ballots and voting via machines. Each of these voting systems is plagued by numerous issues. Paper ballots may cause disputes as to authenticity of a voter's signature, or disputes regarding the validity of the ballot based on whether a voter followed the exact instructions or procedures for filling in or returning the paper ballot, as well as disputes related to other irregularities that may be present. Furthermore, current voting systems that use scanned paper ballots that are hand counted and verified are vulnerable to human error, faulty handling and potential manipulation.

Online voting, or voting using electronic technologies, devices and systems have not been widely implemented because of the many technical issues and challenges faced by such systems and their inability to deliver on two main aspects, the first, to protect the privacy of voters and the votes they cast (herein referred to as "Cast Voter Record" or "CVR"), and the second to make sure that the system is secure from malicious actors, hackers or other forms of manipulation. Privacy and security are two requirements that inherently conflict with each other, especially in end-to-end verifiable systems or elections, where a system may have to compromise privacy or is otherwise unable to meet the security requirements to verify voters and their votes to run an election process. The technologies presented herein aim to solve this problem by introducing a security device and methods for verifiable end-to-end elections that deliver on both aspects, privacy to voters, as well as security throughout the election process.

In various embodiments of the security device (also referred to as the "device") presented herein; the security device serves as a root of trust for chains of certificates that are deployed and utilized throughout the election process. These certificate chains originating with the device, which acts as an intermediate certification authority, are used to create a verifiable trust chain throughout the different parts of the election system that are traceable back to the device and to the original root of trust certificate, which may be stored elsewhere.

Furthermore, in various embodiments, the security device is air-gapped, i.e., never connected to any network, and is incapable of being connected to any network. This is achieved with a custom mainboard that has no radios or other wireless connection points that may allow access to the device, preventing connectivity to any outside sources of potential vectors of attacks. The device also has a very limited number of input ports, the number customizable based on the number of input devices necessary. In several embodiments, the device can only receive data through a data input drive or port, for example a USB drive or port. Other types of input drives and ports may also be used in different embodiments of the device. In some embodiments, the device contains a physical, and in other embodiments, an electronic switch that must be enabled before the drive is able to read and write data from a data transfer device that is inserted into it. In various embodiments, the input drive or port must be enabled via software. In some embodiments, the data transfer device port physically does not allow the insertion of, or connection to a data transfer device until enabled physically or via software.

In various embodiments, the device also acts to provide secure data storage. This is achieved by a variety of ways, including the air-gapped nature of the device as well by ensuring that the device is tamper proof to prevent access to, or allow the recovery of data. The device and methods described herein also ensure there is no linkage between the data or information relating to the identification of voters and the vote/ballot cast (CVR). While the election results and CVRs are publicly available on a public ledger or immutable database, for example, a blockchain, that vote is not associated to voter information, but associates the vote to a unique voter identifier that has already been verified as a voter by the device, but which can never be linked to a voter or their information outside of the device. The link between a voter and the unique voter identifier must be stored within the device and is otherwise inaccessible. This ensures that voter information is completely secure and private.

Even without voter information being publicly available, or available to administrators or officials, the systems presented herein allow for vote reconciliation if needed, for example, if an audit is required post-election. This would necessitate identifying voters that have voted more than once, this could be done by voting via the online systems presented herein in addition to a traditional paper ballot. The link between each voter and the unique voter identifier is stored in the device and cannot be accessed or viewed by any person, including system and election administrators or officials. This link between the unique identifier and the individual voter stored in the device is accessed or extracted by the device when this auditing takes place. Election administrators would input data into the device, which may be data of all paper ballots cast with voter information, the device would then access the online ballots cast and those that are publicly available on a ledger, database or otherwise, and the device is able to identify which CVR belongs to each voter by using the unique identifier linking the CVR and voter. This allows the device to compare the input paper ballot data to the online vote data and compare the two lists, and invalidating any double votes, and/or by applying either pre-set rules or rules inputted by election administrators/officials and producing a correct list of CVRs. The audit would ensure that double votes are eliminated, and the actual CVRs are publicly viewable without exposing individuals or linking votes to individuals.

In several embodiments, throughout the system, a transaction is verified as being from a trusted source by being signed by a private key generated by or from the security device. For most transactions, the public key associated with the private key is known to the different parts of the system, but the private key remains a secret known only to the user submitting the transaction. Once the originator is verified, the system then confirms the validity of the transaction by comparing it against the current state and rules of the system. This means that the system may use a two-step verification system, to verify both the source of data as well as the validity of the data itself.

In some embodiments, the device and other components of the election system rely on public-private key pairs for authentication. In several embodiments, a public key is maintained for the election on a public ledger, blockchain or other immutable storage system or database. When a transaction occurs at a point in the system, the user must have a private key that regenerates for that transaction, to sign the transaction and then is automatically deleted when the transaction is submitted. The private key must correlate with the public key of that point in the system, for example, when a voter submits a vote, the voter must have a private key, and in many embodiments, this private key is regenerated at a certain point of the transaction, the transaction is signed by the private key, the transaction is submitted, and when the private key correlates with the public key on the voting system, the vote is accepted, the private key is once again deleted. Having private keys throughout a system leave it susceptible to attack, therefore the security device's offline nature as well as its cryptographically locked security chip which stores sensitive keys, codes, and tokens ensure that public-private key pairs and other sensitive information cannot be accessed by malicious actors when they are only stored on the security device.

In various embodiments the device provides secure data processing in the system. By making sure that election data processing as well as certificate signing are both exclusively done by the security device, we can always establish root of trust of data and the certificates and signatures associated with that data throughout all the different points in the system, all of which can be traced back to the security device. A process, 'secure device commonality', may be used where data is traced to the security device by identifying all the components the data has interacted with, including any registries, block chain or immutable storages, and if it can be confirmed that these different components have also interacted with the same security device, then it can be confirmed that the data is authentic, in addition to being verified with a certificate traceable to a root certificate provisioned by a trusted source.

In several embodiments, the security device creates one or more export packages, which may include a voter authentication export package (or "voter export package") and an election export package which is sent to different end entities. An end entity in the system can be any person, business, organization, group, corporation or even a specific device, server, database, immutable storage, or another computing device. In many embodiments, the voter authentication export package is produced by the device first by generating random codes or numbers (a "random token" or "authentication code"), preferably by a security chip in the device. Data known only to the voter, which may include personal voter information is used along with the random token in a key derivation function, which uses the combination of the random token and voter known data to derive a public-private key pair. In preferred embodiments this is carried out by the password based key derivation function, PBKDF2, whereas both the voter information and the random token are run through the password based key derivation algorithm such as PBKDF2. The public-private key pair is cryptographically linked with the voter known data/information and the random token. In various embodiments, the private key is generated from the key derivation function, and a public key is derived from the private key.

Once the public-private key pair is generated, the security device will then separate all the data elements (random token, voter known data, public-private keys), and in many embodiments, under the authority of a quorum of users, the security device will create export packages that go to different end entities, or parts of the system. One export package is the voter export package that is sent to the voter, another export package is the election package which is sent to the election database. These packages are transferred to each end-entity or point in the system via data transfer devices, such as a USB. In one embodiment, the election export package is created by the security device, whereby the device creates seed data that contains the public key and sent to one or more points in the election system, a public ledger, blockchain, other immutable data storage and databases, or other parts or end entities of the election system.

In various embodiments, the security device is used to mediate election processes and ensure that those processes meet and maintain security standards. In many embodiments, the device can only be accessed physically, through a display device such as a human machine interface, which may have a very limited user interface that restricts inputs to specific numbers and types of commands, and the outputs to what the software is designed to enable for that election system. The HMI does not allow access to the files or storage of the device, the device's bios, storage drives, command prompts, boot screen or any other part of the device's operating system. The HMI is the only interface to the security device because the device is incapable of being accessed through remote or wireless connections. In numerous embodiments the device requires form validation for it to allow access, where multiple individuals or administrators must validate their credentials, or access the device either simultaneously or together within a specific period or session. The accessing or the device and authentication of people or other administrators may be logged for later auditing. The device allows human access and interaction without exposing any secret or private information or data.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents one exemplary embodiment of a method 100 to initially set up an air gapped security device 10. A root private key 15 is stored securely 110 by an entity, such as a business, organization, agency or corporation, in its headquarters or otherwise. The root private key 15 signs 120 a self-signed root certificate 20. The security device 10 creates and stores 130 the security device private key 35 and the security device certificate signing request 30 (any certificate signing request may be referred to as "CSR"). The root private key 15 is also used to sign 140 the security device CSR 30 stored in the provisioned security device 10, which now becomes the security device certificate/security device intermediate certificate 40. A copy 25 of self-signed root certificate is placed 150 in the security device 10. Multiple security devices can go through the same method 100 and be provisioned and authorized to allow them to serve as back-ups in case the security device malfunctions.

FIG. 2 is a diagrammatical representation of one exemplary embodiment of a method 200 to link the security device to an election management system (referred to as "EMS"). The EMS creates 210 two EMS private key files, preferably PPK files. The EMS then creates 220 two EMS certificate signing requests and creates 230 a data package that contains both certificate signing requests, CSR 1 and CSR 2. An EMS access device copies 240 the data package to removable storage or a data transfer device 7, which is then uploaded 250 into a provisioned air-gapped security device 10. In some embodiments, the data package from the file transfer device 7 is verified by the security device 10. The security device 10 signs the two CSRs, CSR 1 and CSR 2, uploaded into the device 10 with the security device private key 9, registering 260 the EMS with the security device 10. Once the CSRs are signed, they become signed EMS certificates 11 and 22. A data package containing the two signed EMS certificates 11 and 22 as well as a copy of the signed security device certificate 13 is produced and transferred 270 to a data transfer device 8. Via the data transfer device 8, the data package produced from the security device 10 is imported 280 into the EMS system, in many embodiments via an EMS access device 5. The EMS verifies 290 the signed security device certificate 13. The EMS saves 295 the signed EMS certificates 11 and 12 as well as the signed security device certificate 13. When the linking of the EMS to the security device 10 is complete, the security device 10 cannot be linked or work with another EMS, and the EMS cannot be linked with or work with another security device.

FIG. 3 is another diagrammatical representation of another exemplary embodiment of a method 300 to link the security device to an election management system. The linking begins with the EMS initiating 310 the process of registering the security device with the EMS. The EMS generates 320 a private key and at least one CSR. The generated CSR is downloaded 330 into a data transfer device, for example a USB. The data transfer device transfers 340 the data package to the security device. The security device then initiates the process 350 to register the EMS. Depending on the election or rules as set up in the EMS, an optional quorum of individuals or administrators may be required and must be assembled. The quorum must validate 360 the data transfer and registration of the EMS into the security device, this can be done by administrators being physically present at the Human Machine Interface, HMI, or in some embodiments, at the security device. In various embodiments validation is carried out by administrators physically present inputting their details and passwords, in other embodiments other or additional authentication methods may be used to validate each quorum member, including, and not limited to biometric verification, voice verification, and image or video verification. The security device then enables the inserted data transfer device, signs the CSR and saves 370 the security device certificate along with the signed certificate to the data transfer device. The data transfer device transfers 380 its contents into the EMS, possibly via a device that has access to the EMS. The registration of the security device to the EMS is accepted and completed 390. The signed certificate, the security device certificate, the security and/or the device registration information is saved 395 in the EMS.

FIG. 4 is a diagrammatical representation of one embodiment of the security device being utilized in an election system process 400. Data can only be input into the security device 401 or be output from the security device 401 through a data transfer device 405 such as a USB. A quorum of users 410 may be required to access the security device 401 and input data directly into it (but only through an HMI), but only via a data transfer device 405. In various embodiments, EMS data 415 (such as voter lists), including EMS exports 420, can also be input to the device. Update data 425 may also be input to, or output from the security device 401. The device may also output token printing package or other voter authentication export packages 430 and can output blockchain settings data 435 for the running of a public ledger, immutable storage, database or blockchain 440. An election admin or other user 445 can input data into the EMS, through an EMS workstation 450 or other input computing devices, which can then be transferred to the security device 401 via a data transfer device 405. None of these data transfers, inputs or outputs, from the security device are networked data transfers, and they all occur through a physical data transfer device 405 that must be enabled and accepted by the security device as a valid input device, with valid input data. A key feature of this overall system is that each and all pieces of data utilized in the election, whether by the voter, EMS, election officials, public databases, registries, servers, or workstations all go through the security device 401, and therefore are signed and authenticated by a security device private key. This unique signature is traceable throughout the election system at every step to the same security device 401, meaning that any data not containing the device's unique signature is not trusted data, which can then be flagged or invalidated. This is also important for audits, since any vote or ballot (CVR) that does not have the unique device signature is an unverifiable and untrusted vote that may be invalidated.

FIG. 5 presents a simplified embodiment 500 of how the chain of trust in the system is established and traceable through distribution of certificates throughout the system.

The security device 520 used in the certificate distribution is a critical component in creating a secure election while still being able to maintain privacy of the voters. The security device 520 maintains the root of trust for the election as well as being the only place in the system that keeps a tie between identifiable voter information and the data used to secure all voter transactions within the system. The security device 520 is a purpose-built air-gapped hardware device owned and maintained by the administering jurisdiction but provisioned by the developers of the system at the time of assembly such that it can be verified to be a trusted device when delivered to an administering jurisdiction.

The EMS 540 is used to create and maintain election definitions, election infrastructure settings, the voter list, and ballot data. The EMS 540 is responsible for verifying the health of the election network once deployed. As such, the EMS 540 connects to every piece of the system (except for voter devices), via networks and/or manual data transfers.

The election system may further have an election registry server shown as election registry 550. The election registry 550 may contain election ID information and other election-specific information including supported languages and is the access point for the secure data storage 560.

The system leverages blockchain technology to store the election voter list in the secure data storage 560 (also referred to herein as a public ledger or a blockchain) for the purpose of voter authentication and ballot data used to deliver the proper ballot style to each authenticated voter, and the system collects votes from the voter, serving as the digital ballot box. All live election data is located within the public ledger and is reviewable at all times by election admins, voters, and outside observers. Operation can be spread amongst many trustees to spread the trust.

The mobile voting application 530 runs on voter owned and controlled mobile devices. The mobile voting application 530 is used to initiate the voter authentication process, receive the properly assigned ballot, mark the ballot by the voter, and return the encrypted marked ballot and associated cryptographic receipt.

The voter token distribution service uses a token of a voter as an essential piece to creating the authentication of the voter within the system without compromising their identity when tied to a returned ballot. The token creation and distribution can be done by the administering jurisdiction or outsourced depending on scalable needs and security concerns.

A certificate chain may be created as follows. The core element of the system is the security device 520. The security device 520 is provisioned at manufacturing time with a signed root certificate (shows as a root certificate 510) from the private key stored securely at facilities of the developer of the system. The root certificate 510 becomes a common base certificate for all system components including the mobile voting application 530 delivered to voter devices. Intermediate certificates 570, created when the security device 520 is provisioned, are used to reduce the risk involved with having the root certificate sign data directly. The certificate chain may further include end-entry certificates 580.

The system may establish a chain of trust that relies only on one element of social trust, which may be the handling of the root certificate 510 and the provisioning of the security device 520. This security device 520 may become the "Root of Trust" for any given election body.

FIG. 6 presents one embodiment of an exemplary method 600 to provision an air-gapped security device. In various embodiments, a root certificate and root private key are initially stored at the headquarters of an entity, corporate or otherwise, or a secure and non-network connected database. In many embodiments, the root certificate is stored at a secured public storage facility. A security device is manufactured, and in some embodiments more than one identical security device may be manufactured, so that the other devices may serve as backup devices, in cases of failure of the primary security device. A signed copy of the root certificate is produced/issued 605 and stored in the air-gapped security device. A CSR produced by the security device is signed 610 by the root private key, creating a signed intermediate certificate associated with the specific security device. The security device also generates 615 a private key, the key being associated and stored by the device. Finally, the security device is cryptographically locked 620, preventing access to the stored intermediate certificate, the private key and the copy of the root certificate. In some embodiments these could be stored in a security chip of the security device. Furthermore, cryptographic locking can, in some embodiments, be done by the security chip on the security device's custom mainboard. Optionally, the device may be accessed 625, by at least two physically present individuals, who may be election administrators or other officials. This step is required to input data into, or otherwise use the device. In various embodiments, the users accessing the device must verify their presence and credentials, this can be carried out by administrators physically present inputting their details and passwords, and in some embodiments other or additional authentication methods may be used to validate each user, including, and not limited to biometric verification, voice verification, image, or video verification. Also, in numerous embodiments, the accessing and verification is carried out on an HMI and not directly on the security device. The HMI is connected to the device via a serial connection. Also, the human machine interface would provide limited functionality and limited user interface, to restrict what users can access on the security device.

FIG. 7 presents one embodiment of an exemplary method 700 to link the security device and an EMS together. The linking limits the data that can be input into the device to only data from the registered or linked EMS, and in various embodiments can restrict the EMS to only accepting data from the registered security device. The EMS generates at least one private key and at least one certificate signing request 705. The certificate signing request(s) are downloaded to a data transfer device such as a USB, which then must be physically inserted into the security system. In some embodiments, verification and acceptance of the data transfer device and its contents is carried out by the device. The one or more CSRs are then transferred to the security device 710 and signed 715 by the security device private key, creating one or more signed certificates. The signed certificate is then downloaded into a data transfer device, which is then used to transfer the signed certificate into the election management system 720.

FIG. 8 presents an embodiment of an exemplary method 800 to input data into the security device. The device must first be accessed by two or more physically present individuals who may be election administrators or other authorized officials. In various embodiments, the users accessing the device must verify their presence and credentials, this can be carried out by the administrators or users physically present inputting their details and passwords, and in some embodiments other or additional authentication methods may be used to validate each user or administrator, including, and not limited to biometric verification, voice verification, image, or video verification. Also, in numerous embodiments, the accessing is not done on the security device itself but on a human machine interface that is connected to the device, using hard wiring, serially connected to the security device. The human machine interface would provide limited functionality and limited user interface, to restrict what can be accessed on the security device.

Upon successfully accessing the device, an input port, which may be a data transfer device port, such as a USB port, is enabled 805, this enabling can be done via physical switch, or automatically through the software after verification. In preferred embodiments, the port contains special circuitry that leaves it disabled until the installed software application enables it (for example when users access the device and complete verification) for data retrieval, input, or writing. The data transfer device 810 is connected to the lockable port. The data is then copied 815 into the device. The port is then disabled 820 by the device preventing any further transfers of data, and in some embodiments requiring removal of the data transfer device, and may prevent the connecting of any data transfer device into the port, via physical switches, locks, or electronically via software. The copied data content is then decrypted 825 by the device and verified 830 by the device to be of a correct data or file type, and/or to be without error. In some embodiments, an optional verification 835 of the source of the data is conducted by the device, to ensure that it is from a trusted source. This could be done by verifying the signatures on the transferred files. Also, in some embodiments, the device may be configured or is by default able to reject 840 an operation, such as a whole data input/transfer operation, and halting, or in some embodiments undoing or deleting, any copying or installing of any or all data content from the data transfer device into the security device if errors are detected, the file type is not of an accepted type, or the source of any of the files is determined to be of an unverified or untrusted origin.

FIG. 9 presents a method 900 to generate, by the security device, an authenticated voter export package used in an election, that can be used to verify and authenticate a voter. The security device generates 905 a single string by normalizing input data fields and concatenating them together. The security device then performs unicode normalization 910 on the normalized input string using an NFC form. Then a random token or authentication code is generated 915, which may be made up of one or more random codes or numbers, by using a cryptographically secure chip or random number generator. The device then runs 920 both the normalized input data as well as the random token that was generated through a password based key derivation function, such as a PBKDF2 algorithm, deriving a private key. The key's validity is then tested 925 against a desired elliptic (ECC) curve. If the key is not valid, a new random authentication code is generated 915, and the process repeats itself. Otherwise, a public key is then generated/derived 930 from the private key. The device then deletes 935 the private key. In various embodiments, a copy of the public key is then transferred to an immutable storage system, and the voter export package is sent to a voter to allow them to register and cast their ballot in the election.

FIG. 10. is a diagrammatical representation 1000 of an exemplary embodiment of how the security device may encrypt and sign data. Data is hashed 1010 and then signed 1020 by the device private key and verified by the recipient with the public key, i.e., an encrypt and sign method. In this one exemplary embodiment, the hashing may use the SHA-256 algorithm, and the signing via the security device private key will be done with the ECDSA algorithm. Furthermore, all keys will use the secp256k1 curve. In many embodiments, the data that is encrypted has already been formatted to remove all necessary white space. Different formatting of white space in otherwise identical data may produce different hashes and therefore produce a different signature. The data may also be minified, i.e., all unnecessary white space removed from documents before signing. This exemplary embodiment for encryption and signing data may be utilized in other parts of the election system, such as the EMS, workstations, the registries, servers, ledgers, databases, or client devices such as computing, tablet or phone devices.

FIG. 11 is a diagrammatical representation of one method 1100 data is verified by the security device. This method could be implemented by other parts or components of the election system, such as the EMS, workstations, the registries, servers, ledgers, databases, or client devices such as computing, tablet, or phone devices. In this exemplary embodiment, data and data packages received by the security device contain three parts used in verification: the data 1110, the sender's certificate 1120 and the signature 1130 on the data package. Having the sender's certificate 1120 ensures that the source is known and trusted, for example, if the data is coming from the EMS, the EMS would have already been linked to the device, and therefore its certificate is recognized by the device. The sender's public key 1140 is sent along with their certificate and decrypted 1145. The signature 1130 is also decrypted 1145. The hash 1150 is derived from the data 1110 and the message digest 1150 from the hash is compared 1155 against the message digest 1160 from the decrypted signature and public key. If the two are equal then the data is valid 1170 and extracted, installed, transferred, or copied into the security device. In some embodiments, the public key 1140 is already available to the recipient and therefore a certificate containing the public key may not have to be included in the data package.

FIG. 12 presents one embodiment of the security device 1200. The security device includes a custom main board 1210 which contains a compute module 1220, for example, a Raspberry Pi Compute Module 4, that can provide all functionalities of a computing device, including processing, memory transfer, and storage. The compute module 1220 is connected to a crypto authentication chip 1230, for example an ATECC608B, which can carry out several functions, including but not limited to, cryptography, generating random codes, numbers, and tokens, encrypting and decrypting data, generate and store CSRs, as well as public and private keys. The custom mainboard 1210 does not contain any radios or components able to communicate remotely to any source of transmission. The security device may also communicate with a human machine interface 1240 via a serial connection. In various embodiments, the security device may also employ a model-view-controller software model, installed and running on the compute module 1220. The mainboard 1210 also contains a USB hub and switch 1250 which contains special circuitry that leaves it disabled until the installed software application enables it for data retrieval or writing.

FIG. 13 presents one embodiment of a custom security device mainboard 1300. The mainboard 1300 contains a computing module connection 1310 to couple with a compute module. The mainboard 1300 also contains a security chip 1320 that is part of the mainboard, this ensures that the keys are tied to the primary security device and its mainboard. The compute module may be replaced but the integrity of the public and private keys and certificates will remain in place. The mainboard 1300 also contains a protected USB header 1330 which contains special circuitry that leaves it disabled until the installed software application enables it for data retrieval or writing. The USB will not function without the application, and if the application malfunctions or crashes, the USB header 1330 will remain disabled. The custom mainboard 1300 also contains an HMI connector 1340, a four-pin connector to power and provide serial communication with an HMI. The mainboard 1300 also contains a real-time clock 1350. The mainboard 1300 may also contain a battery 1360, a fan 1370, a power supply 1380.

FIG. 14 is a diagrammatic representation of an example machine in the form of a computer system 1401, within which a set of instructions for causing the machine to perform one or more of the methodologies discussed herein. Generally, this example machine is used throughout various parts of the verifiable end-to-end election system, such as voter personal devices, EMS devices, databases, other servers and the like. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1401 includes a processor or multiple processor(s) 5 (e.g., a central processing unit (CPU), a graphics processing unit (GPU), or both), and a main memory 1410 and static memory 1415, which communicate with each other via a bus 1420. The computer system 1401 may further include a video display 1435 (e.g., a liquid crystal display (LCD)). The computer system 1401 may also include an alpha-numeric input device(s) 1430 (e.g., a keyboard), a cursor control device (e.g., a mouse), a voice recognition or biometric verification unit (not shown), a drive unit 1437 (also referred to as disk drive unit), a signal generation device 1440 (e.g., a speaker), and may contain a network interface device 1445. The computer system 1401 may further include a data encryption module (not shown) to encrypt data.

The components provided in the computer system 1401 are those typically found in computer systems that may be suitable for use with embodiments of the present disclosure and are intended to represent a broad category of such computer components that are known in the art. Thus, the computer system 1401 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 1437 includes a computer or machine-readable medium 1450 on which is stored one or more sets of instructions and data structures (e.g., instructions 1455) embodying or utilizing any one or more of the methodologies or functions described herein. The instructions 1455 may also reside, completely or at least partially, within the main memory 1410 and/or within the processor(s) 1405 during execution thereof by the computer system 1401. The main memory 1410 and the processor(s) 1405 may also constitute machine-readable media.

The instructions 1455 may further be transmitted or received over a network 1470, where networked connections are enabled, via the network interface device 1445 utilizing any one of several well-known transfer protocols (e.g., Hyper Text Transfer Protocol (HTTP)). While the machine-readable medium 1450 is shown in an example embodiment to be a single medium, the term "computer-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 215 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer device 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for provisioning and operating an air gapped security device for an end-to-end verifiable election, the method comprising:
   issuing a copy of a signed root certificate to an air gapped security device, wherein the copy of the signed root certificate is stored in the security device;
   generating a certificate signing request;
   signing the certificate signing request by a root private key, producing an intermediate certificate associated with the security device, wherein the intermediate certificate is stored in the security device;
   generating, by the security device, a security device private key associated with the security device, wherein the security device private key is stored in the security device; and
   cryptographically locking the security device, preventing access to the stored intermediate certificate, the security device private key and the copy of the signed root certificate.

2. The method of claim 1 further comprising:
   accessing the security device with at least two individuals physically present at a limited functionality human interface display device coupled to the security device, wherein the at least two individuals must verify their presence via the human interface display device, the human interface display device being connected serially to the security device.

3. The method of claim 2 whereby the accessing is logged and able to be audited.

4. The method of claim 1 further comprising:
   linking the security device to an election management system, wherein data can only be input into the security device if it is data from the linked election management system.

5. The method of claim 4, wherein the linking comprises the following:
   generating at least one private key and at least one certificate signing request by the election management system;
   transferring an election management system package with the at least one certificate signing request to the security device via a data transfer device;
   signing the at least one certificate signing request by the security device, wherein the at least one certificate signing request becomes a signed certificate; and
   transferring the signed certificate to the election management system via the data transfer device.

6. The method of claim 2, further comprising:
   upon accessing the security device, enabling a lockable transfer device port on the security device;
   coupling a data transfer device to the security device via the lockable transfer device port;

copying data on the transfer device into the security device;
disabling the lockable transfer device port;
decrypting copied data content; and
verifying the data content as being without error and of an accepted file type.

7. The method of claim 6 further comprising:
verifying a source of the input data as a trusted source, by verifying that it has a signed certificate traceable to the security device.

8. The method of claim 6 further comprising:
rejecting an operation, upon failure of the verifying of the data content as being without error, of an accepted file type, or from a trusted source, wherein the operation may be one or more of the following: copying, receiving, transferring, or installing the data content.

9. The method of claim 7 further comprising:
rejecting an operation, upon failure of the verifying of the data content as being without error, of an accepted file type, or from a trusted source, wherein the operation may be one or more of the following: copying, receiving, transferring, or installing the data content.

10. The method of claim 6 wherein the data content may include one or more of voter information, registration information, Cast Voter Record (CVR), voter to public key mapping, registry information, blockchain node authentication data, ballots cast, type of ballot cast, type of vote cast, voter ID, social security details, driver license information, driver registration details, number of votes cast, one or more certificate signing request, one or more issued certificate, one or more signed certificates, one or more private keys, one or more public keys, one or more public-private key pairs, Election Management System export data, update data, tokens, token printing package data, blockchain settings data, one or more users, and passwords.

11. The method of claim 1, further comprising:
generating an individualized processed data, based on information known to an end user or entity;
generating a random token or authentication code;
creating a new private key using the individualized processed data and the random token or authentication code;
testing validity of the new private key;
deriving a public key from the new private key, when the new private key is valid; and
deleting the new private key from the security device.

12. The method of claim 11, wherein the generating of the individualized processed data comprises:
normalizing voter information fields; and
concatenating the normalized voter information fields to generate formatted voter data, wherein the formatted voter data is a single string.

13. The method of claim 11, wherein the creating of the new private key is done by a password based key derivation function, wherein the individualized processed data and the random token or authentication code are both used in the password based key derivation function.

14. The method of claim 11, further comprising:
seeding election settings data on an immutable database, wherein the election settings data is associated with the public key.

15. The method of claim 11, further comprising:
creating one or more export packages from the individualized processed data, the random token or authorization code, the public key and the new private key; and
delivering the export package to an end-entity, wherein the end-entity may include one or more of the following: an individual, organization, business, agency, machine, system, network, printer, ledger, database, server, or computing device.

16. The method of claim 15, wherein the export package may include one or more of voter information, registration information, Cast Voter Record (CVR), voter to public key mapping, registry information, blockchain node authentication data, ballots cast, type of ballot cast, type of vote cast, voter ID, social security details, driver license information, driver registration details, number of votes cast, one or more certificate signing requests, one or more issued certificates, one or more signed certificates, one or more private keys, one or more public keys, one or more public-private key pairs, Election Management Systems (EMS) export data, update data, tokens, token printing package data, blockchain settings data, one or more users, and passwords.

17. A security device for providing secure data storage, transmission, processing and certification in an end-to-end verifiable election, the security device comprising:
a compute module; and
a security chip, coupled to the compute module and configured to:
store a copy of a signed root certificate;
generate a certificate signing request, wherein the certificate signing request is signed by a root private key, producing an intermediate certificate associated to the security chip, wherein the intermediate certificate is stored in the security chip;
generate, a security device private key associated with the security chip, wherein the security device private key is stored in the security chip; and
lock the security chip cryptographically, preventing access to the stored intermediate certificate, the security device private key and the copy of the signed root certificate.

18. The security device of claim 17, further comprising:
the compute module, further configured to:
link the security device to an election management system, wherein data can only be input into the security device if it is data from the linked election management system.

19. The security device of claim 17, further comprising:
a human interface display device, that includes a predefined limited functionality user interface that does not allow direct interaction with the rest of the security device, wherein the human interface display device is connected serially to the security device.

20. The security device of claim 17, further comprising:
at least one lockable data transfer device port, in a default disabled state; and
a main board to house the compute module, the security chip, the at least one lockable data transfer device port and at least one switch to enable or disable any of the at least one lockable data transfer device port.

21. The security device of claim 19, further comprising:
accessing the security device with at least two individuals physically present at the human interface display device, wherein the at least two individuals must verify their presence via the human interface display device.

22. The security device of claim 20, further comprising:
the at least one lockable data transfer device port configured to:
be enabled after the security device is successfully accessed by at least two individuals; and
couple with a data transfer device;
the security chip, further configured to:
receive at least one certificate signing request from an election management system via the coupled data transfer device;
sign the certificate signing request, producing a signed certificate; and
the compute module configured to:
receive an election management system package via the coupled data transfer device; and
register the election management system with the security device.

23. The security device of claim 20, further comprising:
the at least one lockable data transfer device port configured to:
be enabled after the security device is successfully accessed by the at least two individuals; and
couple with a data transfer device;
the security chip further configured to:
decrypt copied data content; and
the compute module configured to:
copy the data on the data transfer device to the compute module;
disable the lockable port; and
verify data content as being without error and of an accepted file type.

24. The security device of claim 22, further comprising:
the compute module, configured to:
reject an operation, upon failure of verifying data content as being without error or of an accepted file type, wherein the operation may be one or more of the following: copying, receiving, transferring, or installing the data content.

25. The security device of claim 23, further comprising:
the compute module, configured to:
reject an operation, upon failure of the verifying of the data content as being without error or of an accepted file type, wherein the operation may be one or more of the following: copying, receiving, transferring, or installing the data content.

26. The security device of claim 23, wherein the data content includes one or more of: voter information, registration information, Cast Voter Record (CVR), voter to public key mapping, registry information, blockchain node authentication data, ballots cast, type of ballot cast, type of vote cast, voter ID, social security details, driver license information, driver registration details, personal voter information, number of votes cast, one or more certificate signing requests, one or more issued certificates, one or more signed certificates, one or more private keys, one or more public keys, one or more public-private key pairs, Election Management System (EMS) export data, update data, tokens, token printing package data, blockchain settings data, signed certificates, certificate signing requests, one or more user names, and user passwords, user details, voter registration information, and driver license information.

27. The security device of claim 17, further comprising:
the security chip, further configured to:
generat an individualized processed data, based on information known to an end user or entity;
generat a random token or authentication code;
create a new private key by using the individualized processed data and the random token or authentication code;
test the validity of the new private key;
derive a public key from the new private key, when the new private key is valid; and
delete the new private key from the security device.

28. The security device of claim 27, further comprising:
the security chip, further configured to: create one or more export packages from the individualized processed data, the random token or authorization code, the public key and the new private key.

29. The security device of claim 28, wherein the one or more security device export package may include one or more of: voter information, registration information, Cast Voter Record (CVR), voter to public key mapping, registry information, blockchain node authentication data, ballots cast, type of ballot cast, type of vote cast, voter ID, social security details, driver license information, driver registration details, personal voter information, number of votes cast, one or more certificate signing requests, one or more issued certificates, one or more signed certificates, one or more private keys, one or more public keys, one or more public-private key pairs, EMS export data, update data, tokens, token printing package data, blockchain settings data, signed certificates, certificate signing requests, and one or more user names, and user passwords, user details, voter registration information, and driver license information.

30. The security device of claim 17, wherein the security device is air gapped.

* * * * *